United States Patent
Thompson

(10) Patent No.: US 10,064,769 B2
(45) Date of Patent: Sep. 4, 2018

(54) DUAL CONFIGURATION PORTABLE WHEELCHAIR

(71) Applicant: THOMPSON LAFFERTY DESIGN LIMITED, Greytown (NZ)

(72) Inventor: Peter James Thompson, Greytown (NZ)

(73) Assignee: Thompson Lafferty Design Limited, Greytown (NZ)

( * ) Notice: Subject to any disclaimer, the term of this patent is extended or adjusted under 35 U.S.C. 154(b) by 0 days.

(21) Appl. No.: 15/511,904

(22) PCT Filed: Sep. 17, 2015

(86) PCT No.: PCT/NZ2015/050154
§ 371 (c)(1),
(2) Date: Mar. 16, 2017

(87) PCT Pub. No.: WO2016/043606
PCT Pub. Date: Mar. 24, 2016

(65) Prior Publication Data
US 2017/0290722 A1    Oct. 12, 2017

(30) Foreign Application Priority Data
Sep. 18, 2014    (NZ) .......................... 700168

(51) Int. Cl.
*A61G 5/10* (2006.01)
*A61G 5/08* (2006.01)
*B60B 33/00* (2006.01)
*B60B 33/02* (2006.01)

(52) U.S. Cl.
CPC .......... *A61G 5/1051* (2016.11); *A61G 5/0825* (2016.11); *A61G 5/0866* (2016.11); *A61G 5/1037* (2013.01); *B60B 33/0002* (2013.01); *B60B 33/02* (2013.01)

(58) Field of Classification Search
CPC ...... A61G 5/10; A61G 5/1051; A61G 5/1018; A61G 5/1089; A61G 7/1083
See application file for complete search history.

(56) References Cited

U.S. PATENT DOCUMENTS

| 5,188,383 | A  | * | 2/1993 | Thompson | A61G 5/08 280/250.1 |
| 6,467,788 | B1 | * | 10/2002 | Li | A61G 5/08 280/304.1 |
| 6,682,152 | B2 | * | 1/2004 | Melgarejo | A61G 5/10 301/111.01 |
| 6,883,819 | B2 | * | 4/2005 | Byrd | A61G 5/00 280/250.1 |
| 9,757,289 | B1 | * | 9/2017 | Simons | A61G 5/024 |

* cited by examiner

*Primary Examiner* — Bryan A Evans
(74) *Attorney, Agent, or Firm* — Adler Pollock & Sheehan P.C.; Daniel J. Holmander, Esq.

(57) ABSTRACT

A portable wheelchair is collapsible for ease of development, handling and transport, while also providing a front steer configuration and a rear steer configuration.

18 Claims, 17 Drawing Sheets

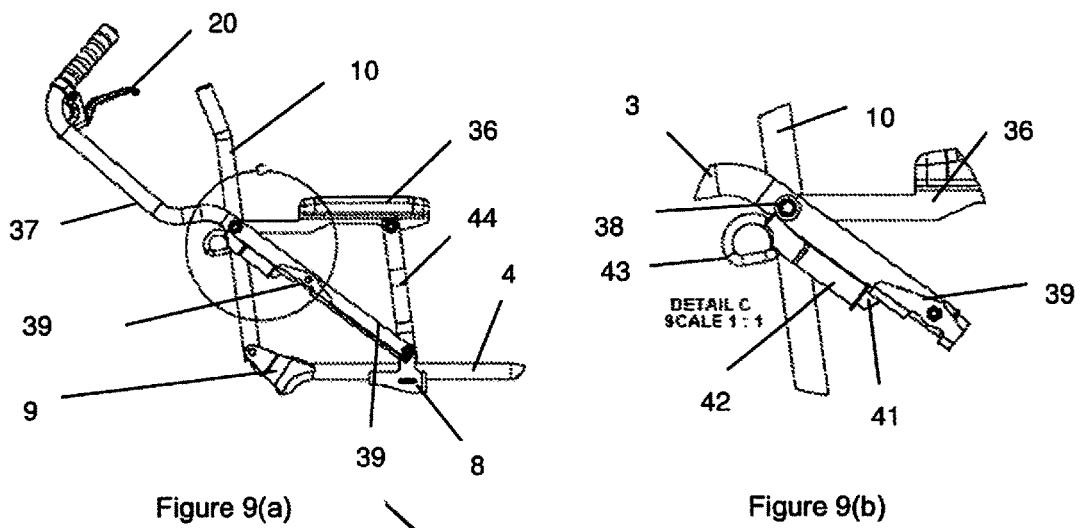
Figure 9(a)　　Figure 9(b)
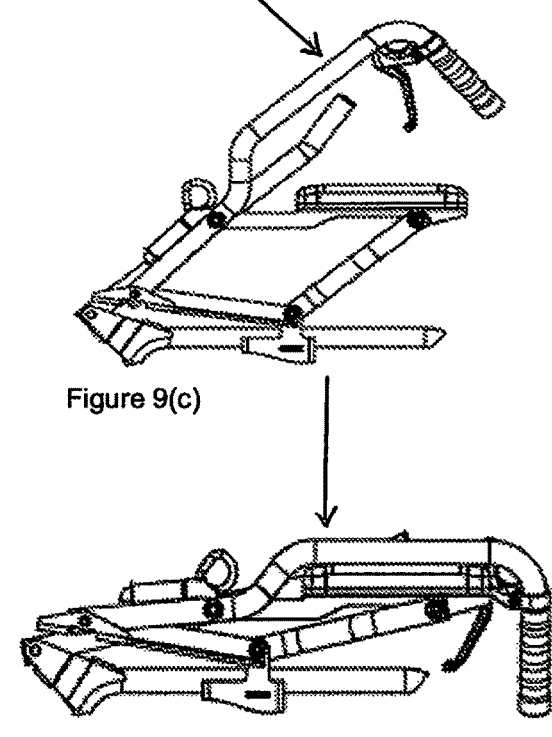
Figure 9(c)
Figure 9(d)

Figure 10(a) Straight ahead rear wheel position

Figure 10(b) Turned rear wheel position

DUAL CONFIGURATION PORTABLE WHEELCHAIR

RELATED APPLICATIONS

This application is a national phase filing under 35 U.S.C. § 371 of International Application No. PCT/NZ2015/050154 filed Sep. 17, 2015, which claims priority from New Zealand application number 700168, filed Sep. 18, 2014, the entire contents of each are hereby incorporated by reference herein.

FIELD OF THE INVENTION

The present invention relates to improvements in the design of a portable wheelchair. The portable wheelchair is collapsible for ease of deployment, handling and transport, while also providing a front steer configuration and a rear steer configuration.

BACKGROUND OF THE INVENTION

Portable and collapsible wheelchairs have been developed in the past and one such wheelchair is described in PCT/2013/000169. However no dual steering configuration wheelchairs have been described that provide a lightweight, collapsible and portable wheelchair with an ability to be maneuvered over moderately rough terrain.

It is therefore an object of the invention to provide the public with a useful choice or to at least provide the public with a useful alternative.

SUMMARY OF THE INVENTION

The present invention provides a portable and collapsible wheelchair having an interchangeable front wheel steer configuration and a rear wheel steer configuration; and having
 (a) a pair of side frame assemblies each having an upper tube member and a lower tube member and forward and aft sections; and
 (b) a 6 bar linkage mounted on the side frame assemblies, which linkage extends centrally between the side frame assemblies, which linkage is foldable from an extended, in-use position, to a collapsed, folded, position;
 (c) a pair of front wheels with each wheel being attached to the forward section of the side frame assemblies and wherein the front wheels can be converted from having no swivel ability when the wheelchair is in rear steer configuration to having swivel ability when the wheelchair is in a front steer configuration,
 (d) a pair of rear steer wheels that can swivel freely in a rear steer configuration and which can be converted from having swivel ability when the wheelchair is in rear steer configuration to having no swivel ability when the wheelchair is in front steer configuration, with each rear wheel being attached to the aft section of the side frame assemblies,
 (e) a pair of collapsible pushing handles that are attached to the side frame assemblies,
 (f) a pair of arm rests that are attached to the side frame assemblies,
 (g) a pair of back support arms that secure a back support, wherein each back support arm is attached to the aft section of one of the side frame assemblies and
 (h) a seat support that extends above the 6 bar linkage and between the side frame assemblies;
wherein in use the wheelchair is deployed by (i) spreading the side frame assemblies apart to extend the 6 bar linkage into a locked position and (ii) putting the pair of collapsible pushing handles into a locked in-use position and further wherein in use the wheelchair is collapsed by (i) pulling a handle proximate the central position of the 6 bar linkage to release the locked position of the 6 bar linkage to pull the side frames assemblies together, and (ii) collapsing the collapsible handles from their in-use locked position to a folded out of use position into a compact, readily lifted and transportable configuration; and further wherein the conversion between rear and front wheel steer configurations is achieved by either locking off the pivot ability in the rear wheels and enabling pivot ability in the front wheels to convert the wheelchair into front wheel steer configuration or by enabling the swivel ability in the rear wheels and removing the pivot ability in the front wheels to convert the wheelchair into rear wheel steer configuration.

In one embodiment the conversion of the front wheels from rear steer configuration to front steer configuration is achieved by replacing the front wheels with a pair of swivelling wheels. In one embodiment the swivelling wheels are a pair of castor wheels. In one embodiment the castor wheels include braking means.

In another embodiment the conversion of the rear wheels from rear steer configuration to front steer configuration is achieved by locking off the swivel ability of the rear wheels with a locking pin. In one embodiment the locking pin is the axle of the front wheel used in rear steer configuration.

In one embodiment, the 6 bar linkage includes a pair of geared hinge linkages.

In another embodiment the rear wheel is biased by way of a biasing member to keep the rear steer wheel aligned in a substantially straight ahead manner when in rear steer configuration.

In another embodiment the pair of collapsible pusher handles include ergonomically angled handles.

In another embodiment the pair of collapsible pusher handles include a brake lever that activates a front wheel brake in at least one of the front wheels.

In another embodiment the wheelchair is collapsible into a size no greater than about 800 mm×about 350 mm×about 700 mm.

In one embodiment the wheelchair includes a pair of foot rests that are secured to the forward section of the side frame assembly. Preferably the foot rests can pivot through about 90 degrees relative to the side frame assembly.

In another embodiment each foot rest is designed to rotate upwardly against the side frame assembly. More preferably each foot rest is designed to rotate upwardly against the side frame assembly and then to rotate towards the seat support. In an alternative embodiment each foot rest is designed to rotate towards the seat support and then to rotate upwardly against the side frame assembly.

In another embodiment the wheelchair further includes a lap safety belt for use by an occupant.

In another embodiment the wheel chair includes at least one hand brake that acts upon at least one of the front wheels.

In another embodiment the handle of the wheelchair that in use is pulled to break the 6 bar linkage upon collapse of the wheelchair is also adapted in size and shape to provide a carry handle for the wheelchair in its collapsed configuration.

The foregoing brief summary broadly describes the features and technical advantages of certain embodiments of the present invention. Further technical advantages will be described in the detailed description of the invention that follows. Novel features which are believed to be characteristic of the invention will be better understood from the detailed description of the invention when considered in connection with any accompanying figures and examples. However, the figures and examples provided herein are intended to help illustrate the invention or assist with developing an understanding of the invention, and are not intended to be definitions of the invention's scope.

BRIEF DESCRIPTION OF THE DRAWINGS

FIG. 9(a) shows a side view of the relationship between the handle, arm rest and the upper tube of the side frame assembly in the position when the wheelchair is in deployment configuration.

FIG. 9(b) shows Detail C of FIG. 9(a).

FIG. 9(c) shows a side view of the relationship between the handle, arm rest and the upper tube of the side frame assembly when the wheelchair is in a partially collapsed configuration.

FIG. 9(d) shows a side view of the relationship between the handle, arm rest and the upper tube of the side frame assembly when the wheelchair is in collapsed configuration.

FIG. 10(a) shows a side view of the rear wheel connection to the aft section of the side frame assembly where the rear wheel is being propelled in a straight ahead direction whilst in rear steer configuration.

FIG. 10(b) shows a side view of the rear wheel connection to the aft section of the side frame assembly where the wheel is being turned in rear steer configuration.

DETAILED DESCRIPTION OF THE INVENTION

Prior to setting forth the invention in detail, it may be helpful to provide definitions of certain terms to be used herein.

The term "about" as used herein in connection with a referenced numeric indication means the referenced numeric indication plus or minus up to 10% of that referenced numeric indication. For example, the language "about 50" units covers the range of 45 units to 55 units.

Figure 1:
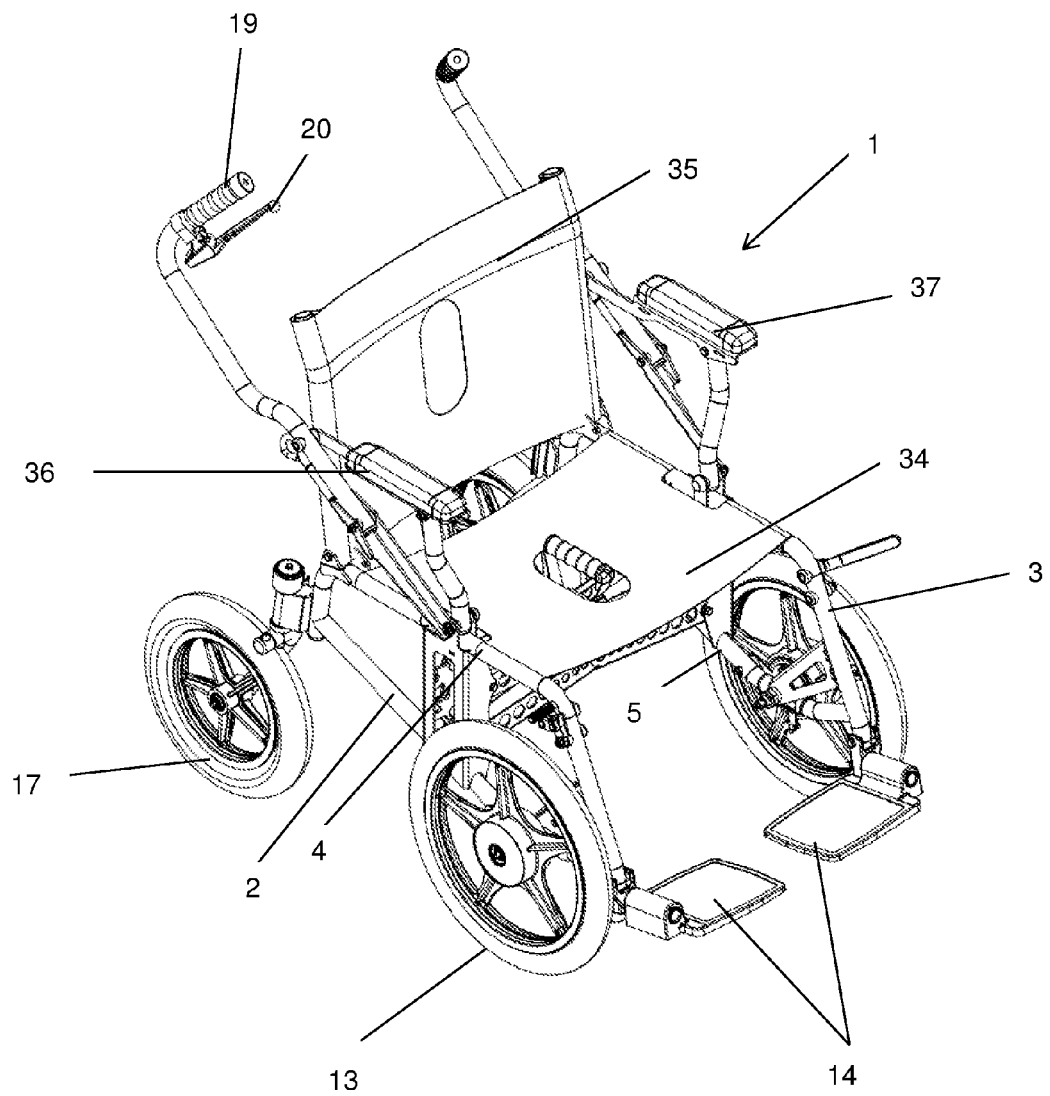
FIG. 1 shows a perspective view of one embodiment of a wheelchair in rear steer configuration.
Figure 2:
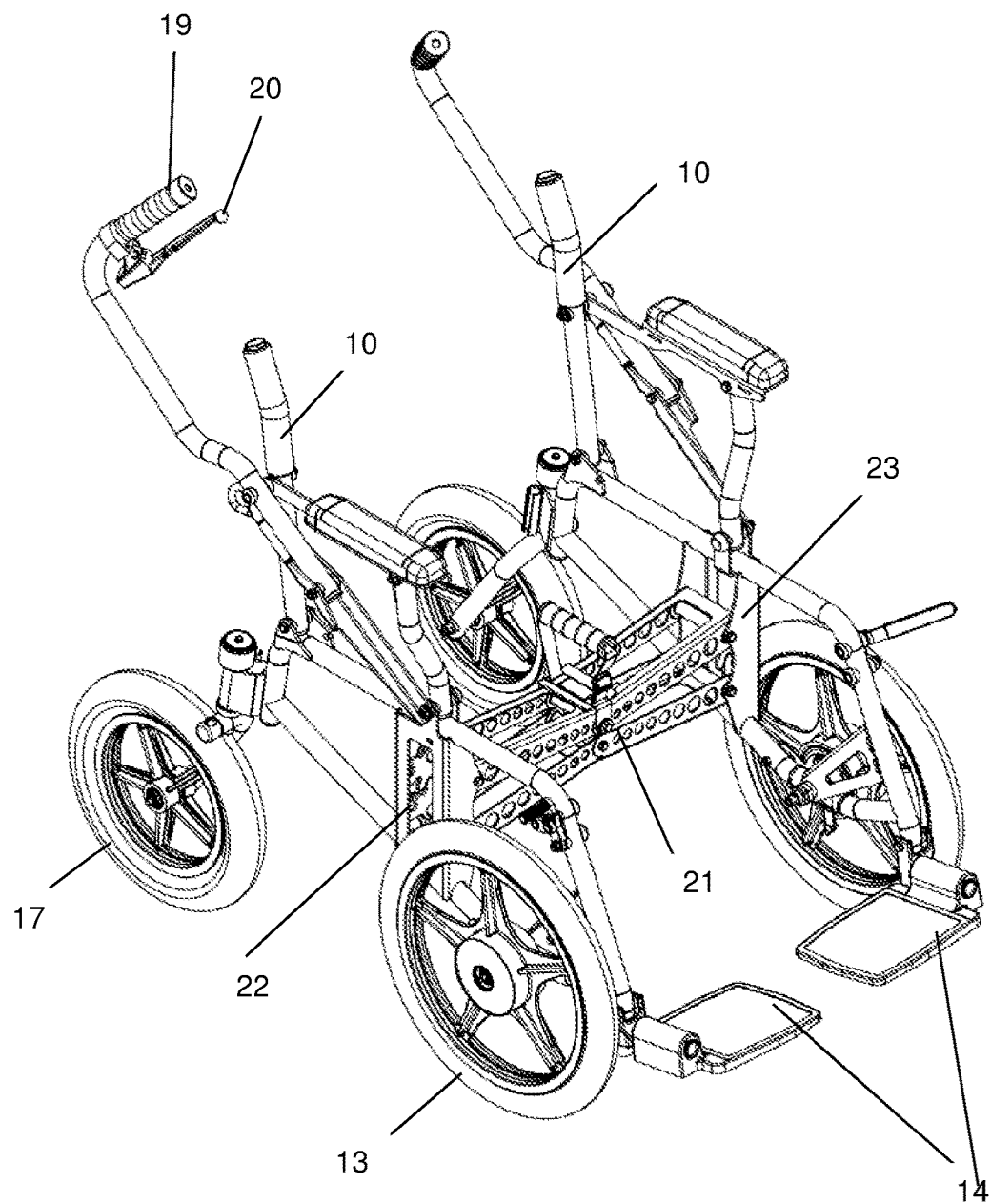
FIG. 2 shows a perspective view of the wheelchair shown in FIG. 1 without the seat and back rest in place in rear steer configuration.
Figure 3:
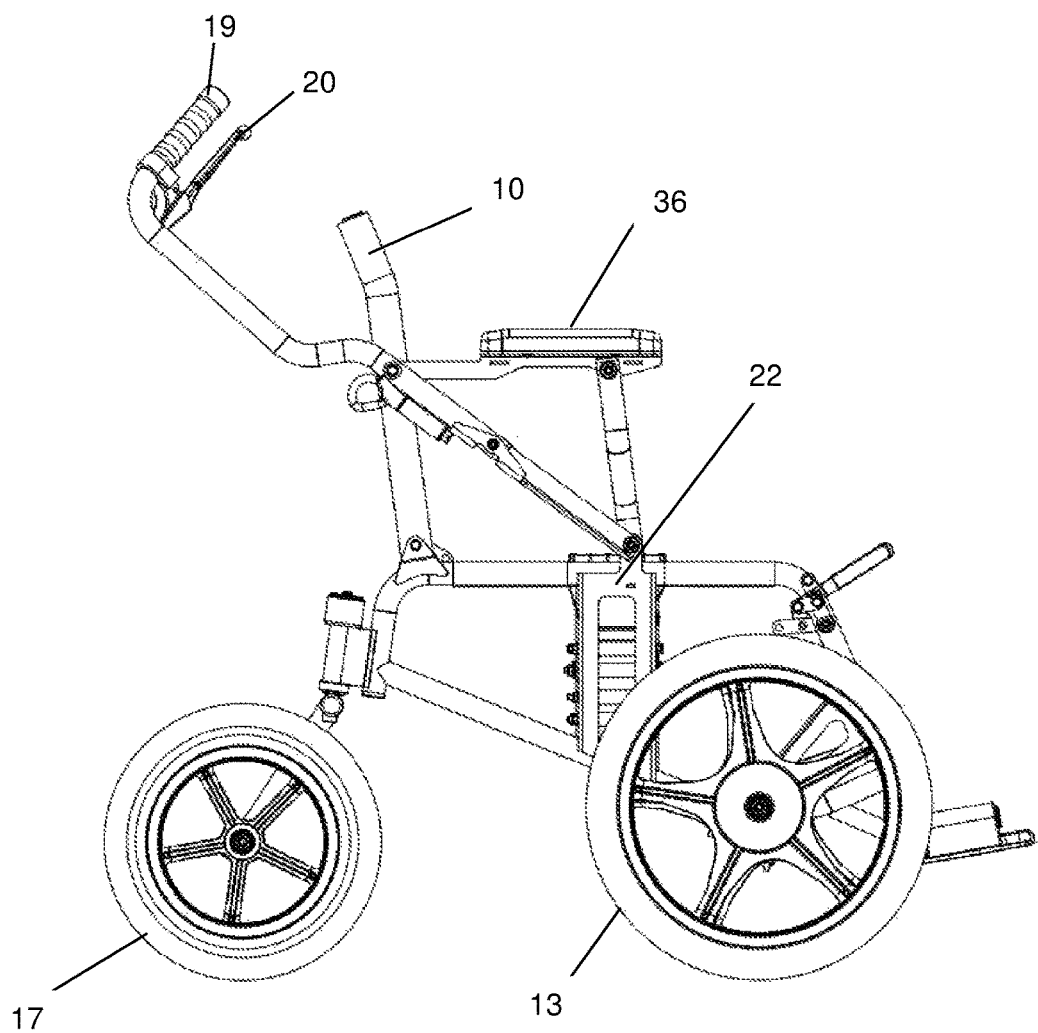
FIG. 3 shows a side view of the wheelchair shown in FIG. 1 in rear steer configuration.
Figure 4A:
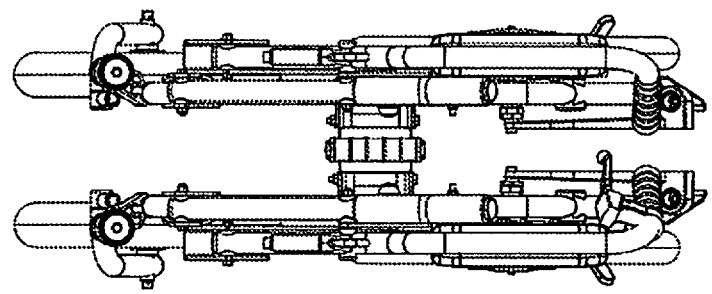
FIG. 4(a) shows a top view of the wheelchair in FIG. 1 in a collapsed state in rear steer configuration.
Figure 4B:
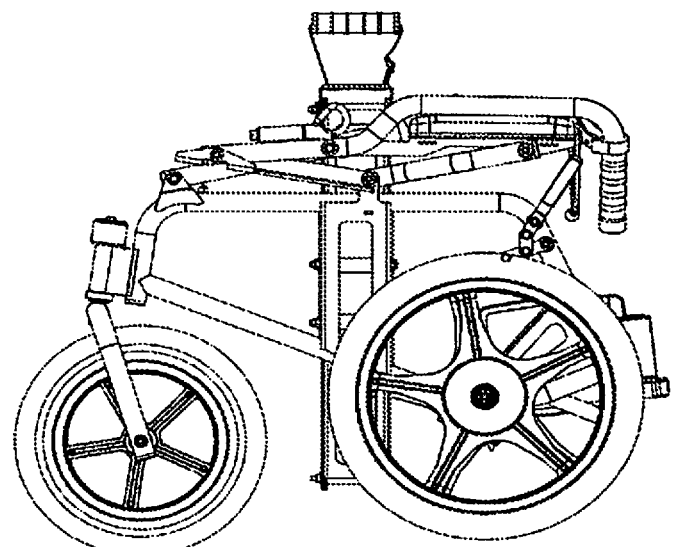
FIG. 4(b) shows a side view of the wheelchair in FIG. 1 in a collapsed state in rear steer configuration.
Figure 4C:
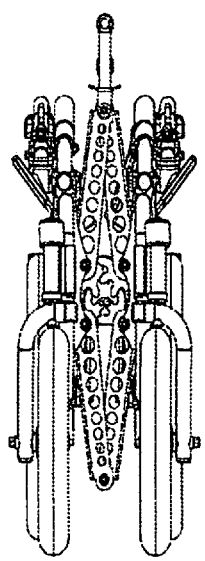
FIG. 4(c) shows a bottom view of the wheelchair in FIG. 1 in a collapsed state in rear steer configuration.
Figure 6A:
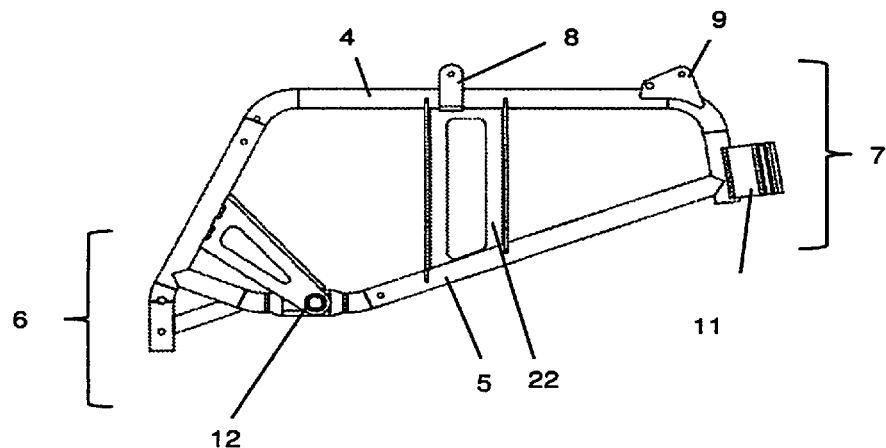
FIG. 6(a) shows a side view of the right side frame assembly of the wheelchair.
Figure 6B:
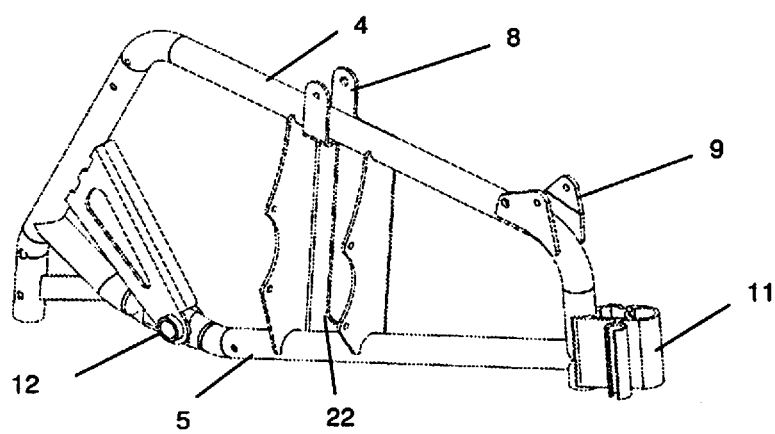
FIG. 6(b) shows a top perspective view of the side frame assembly shown in FIG. 6(a).
Figure 6C:
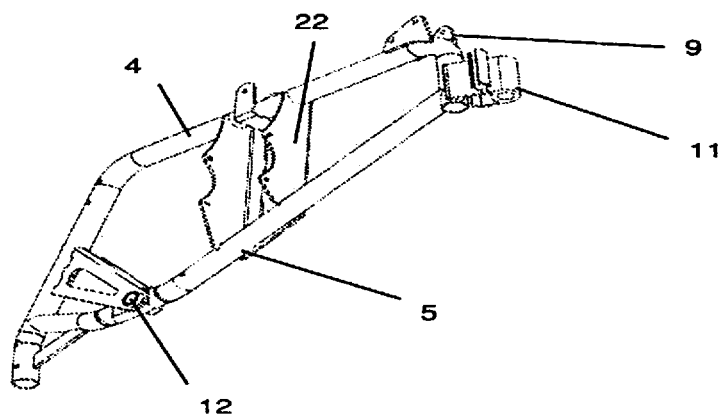
FIG. 6(c) shows a bottom perspective view of the side frame assembly shown in FIG. 6(a).
Figures 8A, 8B:
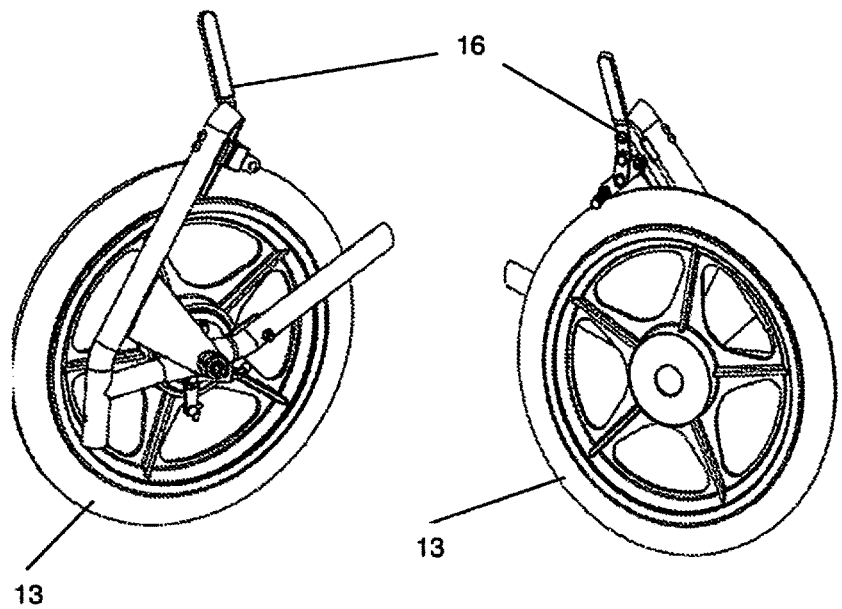
FIG. 8(a) shows the mounting of a front wheel to the forward section of the side frame assembly in rear steer configuration.
FIG. 8(b) shows the mounting of a front wheel hand brake proximate the forward section of the side frame assembly in rear steer configuration.
Figure 12A:
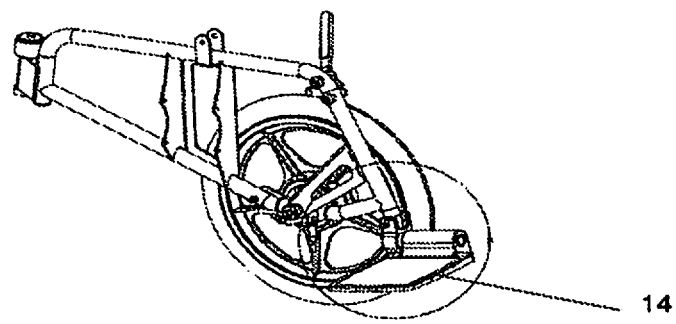
FIGS. 12(a) to 12(c) show the dual rotation feature of a footrest of the invention.
Figure 12B:
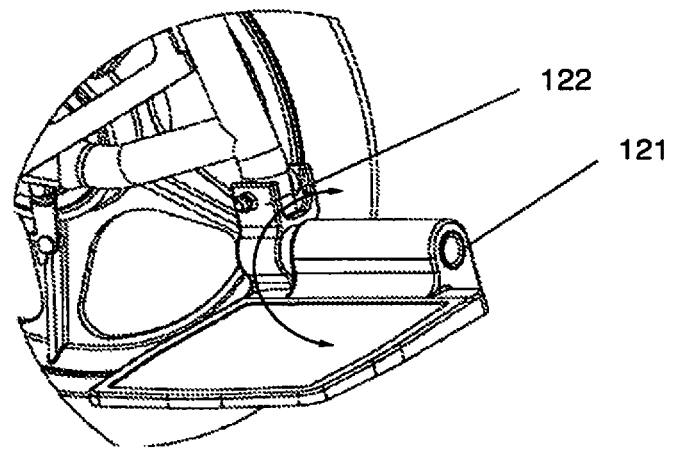
Figure 12C:
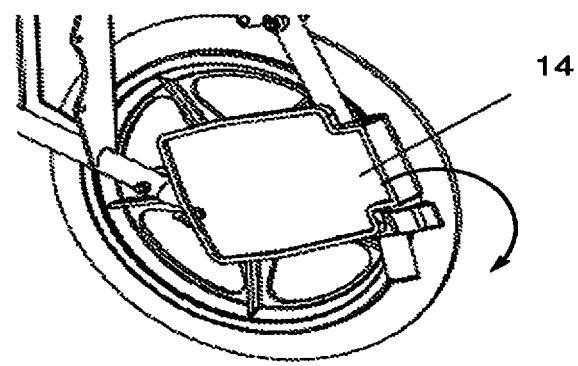

With reference to FIGS. 1 to 3 a wheelchair 1 of one embodiment of the invention is shown. The wheelchair includes a pair of side frame assemblies, 2 and 3 respectively. The side frame assemblies 2 and 3 are equivalent in configuration, shape and dimensions except for the fact that each assembly is a mirror image of the other. The wheelchair 1 has a right side frame assembly 2 and a left side frame assembly 3 when looking at the wheelchair from the back of the chair to the front of the chair. The shape and configuration of the right hand side frame assembly 3 is shown in particular detail in FIGS. 6(a) to 6(c). The side frame assemblies are constructed from metal tubing, having a round, elliptical or square cross section. The tubing is preferably made from aluminium or some other metal preferably light weight metal of about 25 mm-32 mm (1 inch-1¼ inch) in diameter or cross sectional width and depth. The side frame assembly includes an upper tube member 4 and a lower tube member 5. The upper and lower tube members are shaped by bending around formers into the desired shape. The upper tube member 4 is connected to the lower tube section in both the forward section 6 (shown in 6(a)) and aft section 7 (shown in 6(a)). The lower and upper tube members are joined together at their respective forward and aft sections by welds. The upper tube member 4 of the side frame assembly also provides an bracket on the side frame assembly 8 that is connected by a bolt and bracket system to the upper tube 4. With reference to FIGS. 6(a) to 6(c) the side frame assemblies include an aft upper tube bracket 9 that is used to connect to a back support arm 10 as shown in FIGS. 2 and 9(a). The aft section 7 of the side frame assembly also includes a rear wheel mounting bracket 11. The forward section 6 of the lower tube member 5 provides a mount 12 for a front wheel 13 (as shown in FIG. 8) The forward section of the upper tube member 4 is adapted to provide means to mount a foot rest 14 (as shown in FIG. 1) and also means for mounting a mount 15 for a front wheel hand brake 16. The foot rest 13 in this embodiment is a standard off the shelf hinged foot rest constructed from a light plastic or aluminium alloy material. Preferably the foot rest is pivotable through about 90 degrees relative to the side frame to ease occupant ingress. The height of the footrests may be positioned at a plurality of heights along the upper side frame 4 to suit the occupant as required. As shown in the foot rest embodiment in FIGS. 12(a) to 12(c) a dual rotation foot rest mechanism is illustrated. The foot rest 14 is first rotatable about 90 degrees towards the side frame as shown in FIG. 12(c) about a first axle or pivot 121. The folded footrest 14 is then further rotatable towards the seat of the wheelchair about a second pivot point 122. The footrest when folded about the second pivot point 122 (as shown in FIG. 12(c) shows the foot rest folded against the side frame and out of the space through which a user must step to get into or out of the seat.

Figure 8C:
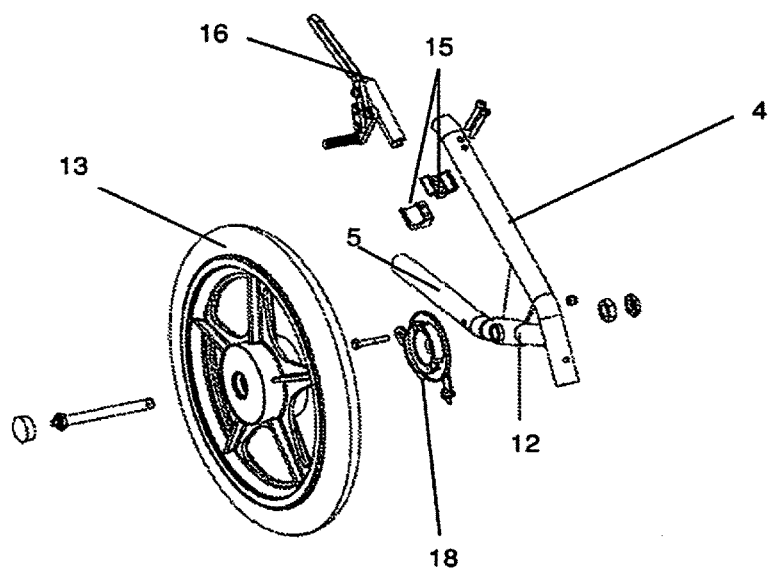
FIG. 8(c) shows the mounting of a front hub drum brake between the front wheel and the side frame assembly and also the components that allow for the mounting of the front wheel hand brake shown in FIG. 8(b) in rear steer configuration.

The front and rear wheels 13 and 17 respectively may optionally include mudguards to protect the chair occupant from splashes or dirt and dust flicking off the wheels. The front wheel 13 is preferably between 8-20 inches in diameter (more preferably around 16 inch) and includes preferably plastic or metal spokes, plastic or metal rims and an inflatable pneumatic tyre or polyurethane foam filled rubber tyre. The size of the rear wheel is a 12.5 inch wheel but it is envisaged that a range of wheel size from 6 inch to 14 inch would be suitable. It is also preferred that the front and optionally the rear wheels are removable from their axle mounts by a quick release axle, that is a hub push button release system or spring clip. It is also preferred that the front wheel includes an internal expanding shoe drum brake 18 as shown in FIG. 8(c) that is cable operated. With reference to FIG. 1, the cable (not shown) for the brake 18 runs through or adjacent to the pushing handle 19 proximate which a brake handle 20 is provided to activate the brake. In one embodiment it is also envisaged that it may be desirable to have the two front brakes activated by a single brake lever that may activate both front wheel drum brakes 18 simultaneously.

Figure 5A:
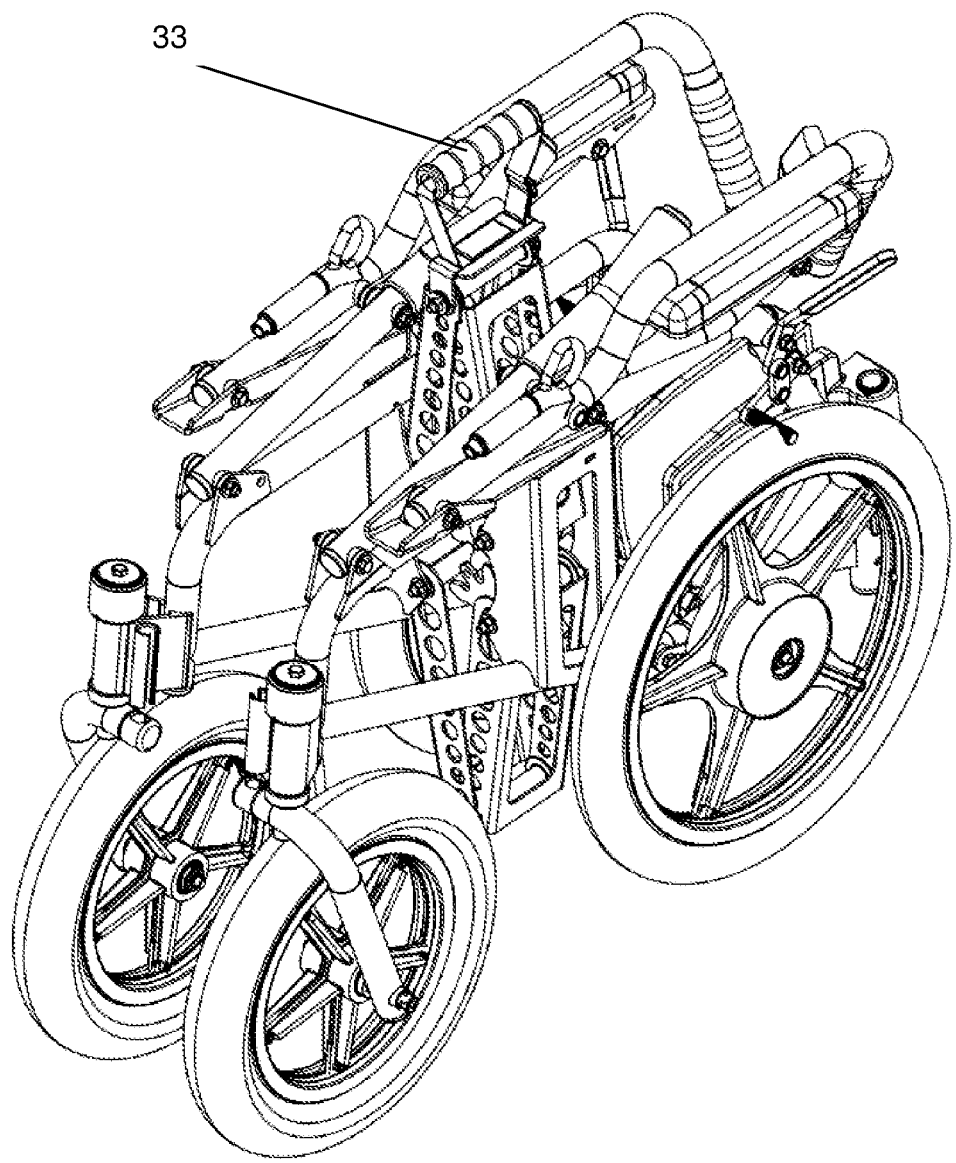
FIG. 5(a) shows a rear perspective view of the wheelchair in FIG. 1 in a collapsed state in rear steer configuration.
Figure 5B:
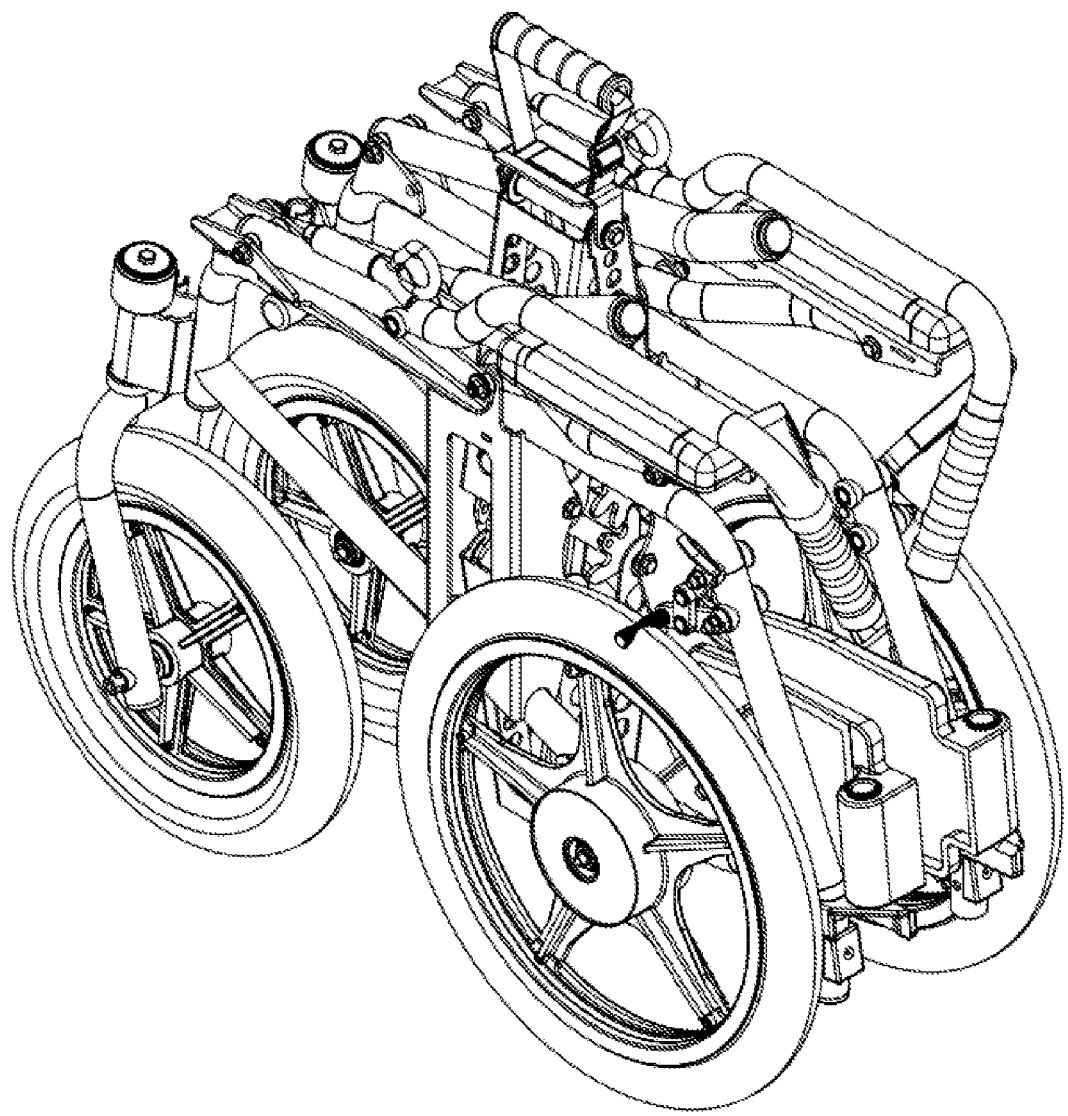
FIG. 5(b) shows a front perspective view of the wheelchair in FIG. 1 in a collapsed state in rear steer configuration.
Figure 7A:
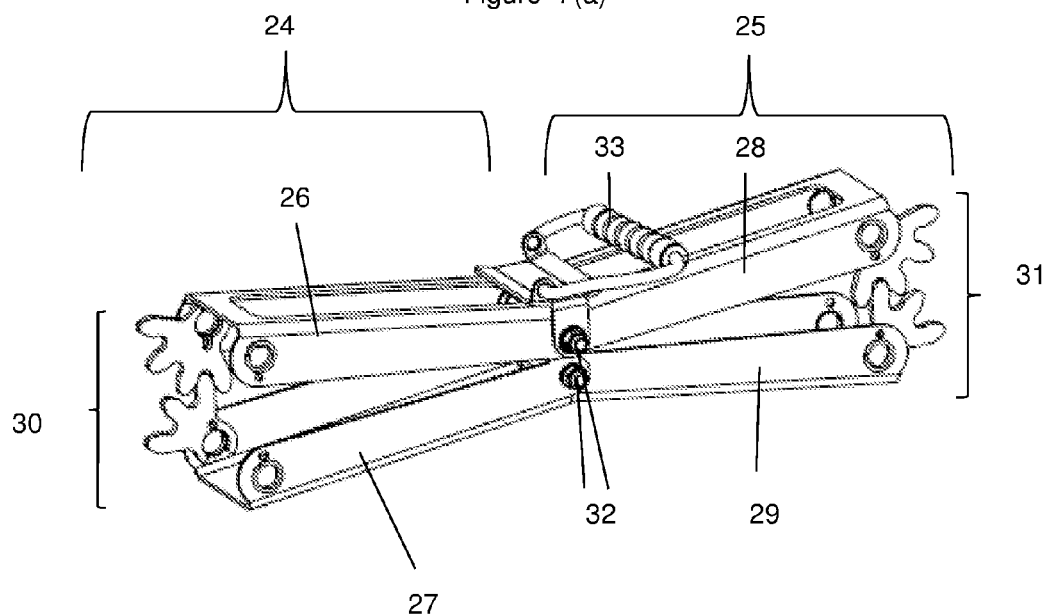
FIG. 7(a) shows a 6 bar linkage of the present invention as it would appear in a wheelchair ready for use.
Figure 7B:
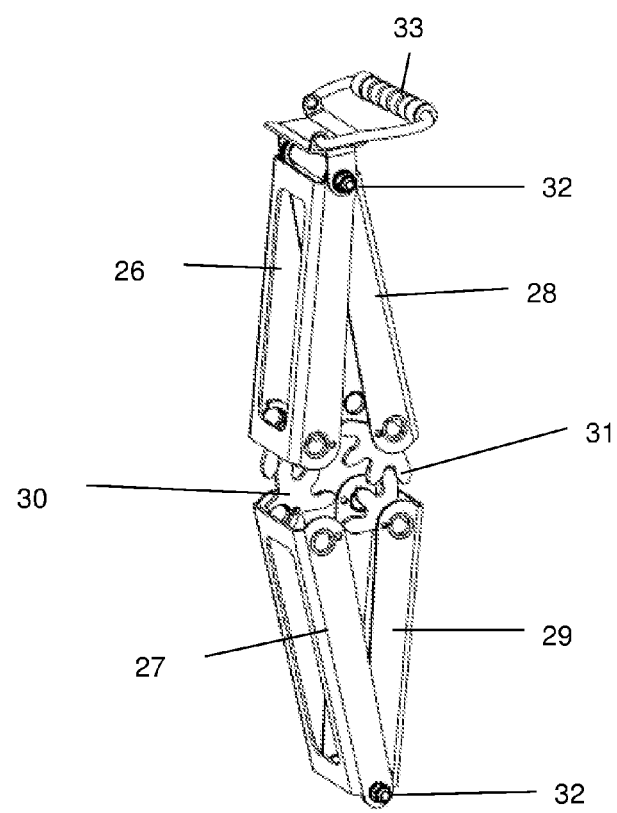
FIG. 7(b) shows a 6 bar linkage of the present invention as it would appear in a wheelchair that has been collapsed for transport.

The collapsibility of the wheelchair is achieved by a 6 bar linkage 21 as shown in FIGS. 7(a) and 7(b). The 6 bar linkage is mounted to the pair of side frames by way of a pair of hinge mounts 22 and 23 respectively that are positioned between the upper and lower tube members of the side frame assemblies 2 and 3. The hinge mounts 22 and 23 are located substantially centrally along the length of the upper and lower tube members of the side frame assemblies as shown in FIGS. 6(a) to 6(c). The hinge mounts span between the upper and lower tube members. With reference to FIG. 7(a) the 6 bar linkage includes a pair of geared hinge units 24 and 25 respectively. Each geared hinge unit includes an upper hinge link (upper hinge links (26 and 28) respectively and lower hinge links (27 and 29)) respectively. However, it is to be appreciated that these hinge units 24 and 25 could be rotated 90 degrees to provide a front and rear/aft facing linkage. The hinge linkage rotates about a pivot point through a pair of involute sector spur gears 30 and 31 that positively engage with each other and lead to a locked hinge arrangement when the wheel chair is deployed for use. The gears 30 and 31 maintain the correct relative positions of the links. In use, the arrangement of the hinge links is such that you can achieve a locking action brought about by an over centre arrangement/geometry of the links. Preferably the 6 bar linkage would include a positive stop on the upper and lower linkages that prevents the linkages from clashing around the central pivot section 32. In use, when the wheelchair 1 is being collapsed, the 6 bar linkage is broken by pulling on a handle 33 attached to the upper pair of links 26 and 28 at the central pivot section 32. With reference to FIGS. 1 and 5 the handle 33 is pulled to extend through the seat base 34 and collapsed back rest 35 to bring the side frame assemblies 2 and 3 of the wheelchair 1 together. It is to be appreciated that the hinge links may be made out of a lightweight metal (such as aluminium, titanium or pressed steel) or a rigid plastic material or a composite of plastic and metal.

The 6 bar linkage is torsionally flexible to allow the side frames to move relative to one another when in use. This allows all four wheels to remain in contact with the ground over moderate undulations and enhances the occupant's comfort and wheelchair stability.

With reference to FIGS. 1 and 2, the pair of side frame assemblies 2 and 3 also support a pair of arm rests 36 and 37 by way of a bracket on the side frame assembly 8 (see FIG. 6(a)-6(c) by a bolt and bracket system. A pair of conventional arm rests 36 and 37 are provided and are shown in the embodiment exemplified. With reference to FIG. 9(a) and Detail C as shown enlarged in FIG. 9(b) the rear of the arm rest 36 is mounted partway along the length of the pushing handle and the back rest upright 10. It can be seen from FIG. 9(a) that there is a four bar linkage hinge between the collapsible pushing arms 37 and the arm rest 36. As shown in FIG. 9(b) the bracket for the aft section of the arm rest 36 also mounts the bracket or link at connection point 38 for the collapsible pushing arm 37. The arm rest link 39 at its lower end is pivotally attached to the side frame assembly 2 along the upper tube 4 of the side frame assembly by a bracket on the side frame assembly 8. The bracket 8 on the upper tube 4 of the side frame assembly is a folded plate or die cast bracket, which also connects to the arm rest linkage 44. The connection between the pushing arm 37 and the arm rest link 39 is controlled by a releasable or retractable locking pin 41 that is mounted on the lower part of the pushing arm 37. The locking pin 41 prevents the rotation of the pushing handle 37 relative to the pushing arm link 40. The locking pin 41 slides in a sleeve 42 mounted on the pushing arm 37. The locking pin 41 can be retracted clear of the pushing handle link 39 by retracting the pin into the sleeve 41 by an actuating means 43. The pushing arm 37 at its upper end is shaped and dimensioned to provide an ergonomically positioned handle 19. The pushing handle 19 also supports a brake lever 20 that controls in this example front wheel brakes and optionally other controls such as, rear brakes and rear wheel pivot limiters or the like.

The brake levers 20 also preferably include a locking pin (not shown) so that the brakes can be engaged on a permanent basis until selectively disengaged.

Figure 13:
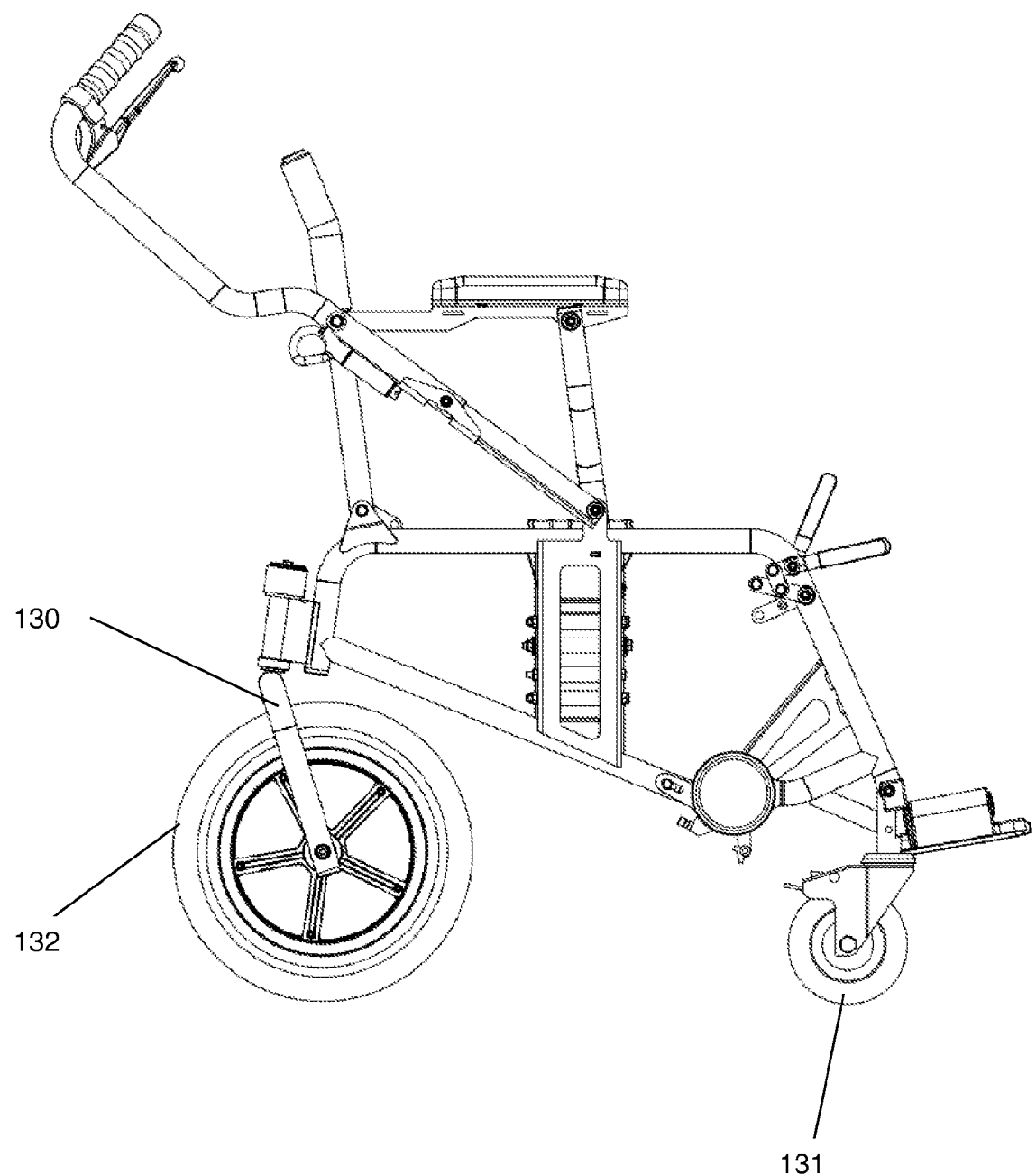
FIG. 13 shows a schematic side view of the wheel chair frame of the present invention in front steer configuration.
Figure 14:
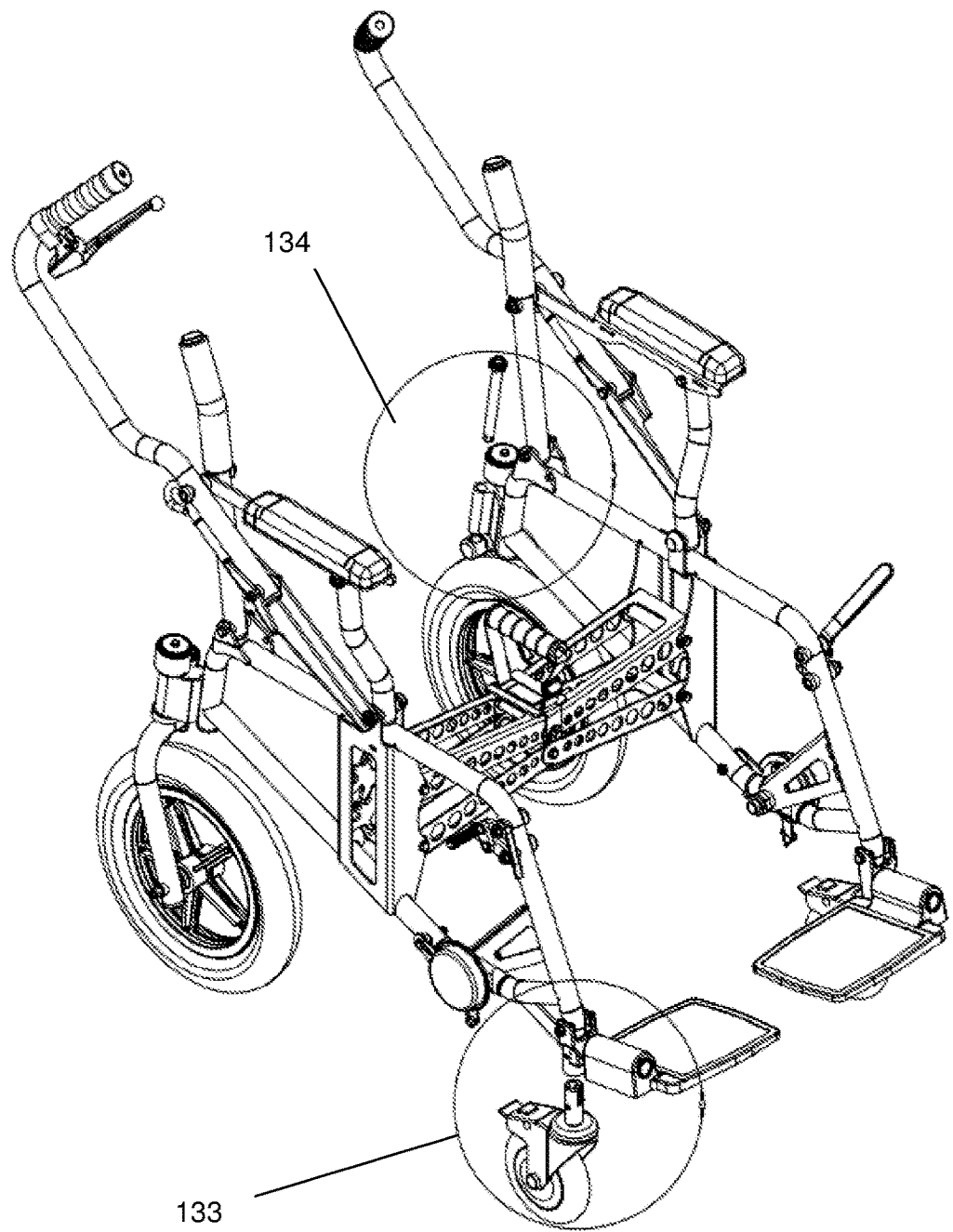
FIG. 14(a) shows a schematic perspective view of the wheel chair frame of the present invention in front steer configuration.
FIGS. 14(b) and 14(c) show an exploded view of the locking mechanism for locking off the swivel ability of the rear wheel when converting the wheelchair to front wheel steer configuration.
FIGS. 14(d) and 14(e) show an exploded view of the connection of a front swivel wheel used to convert the wheel chair to front wheel steer configuration.
Figure 14B:
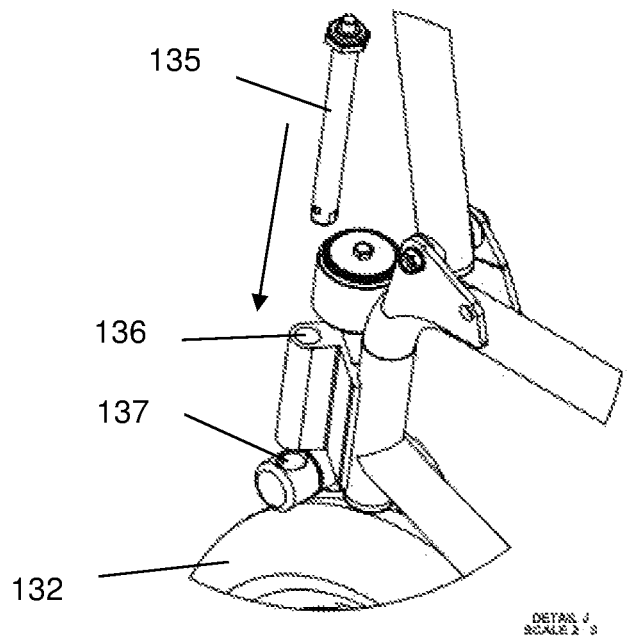
Figure 14:
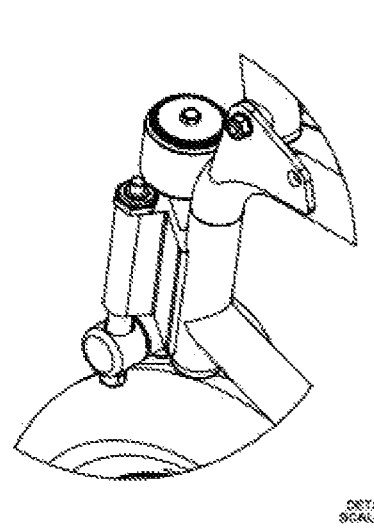
Figure 14D:
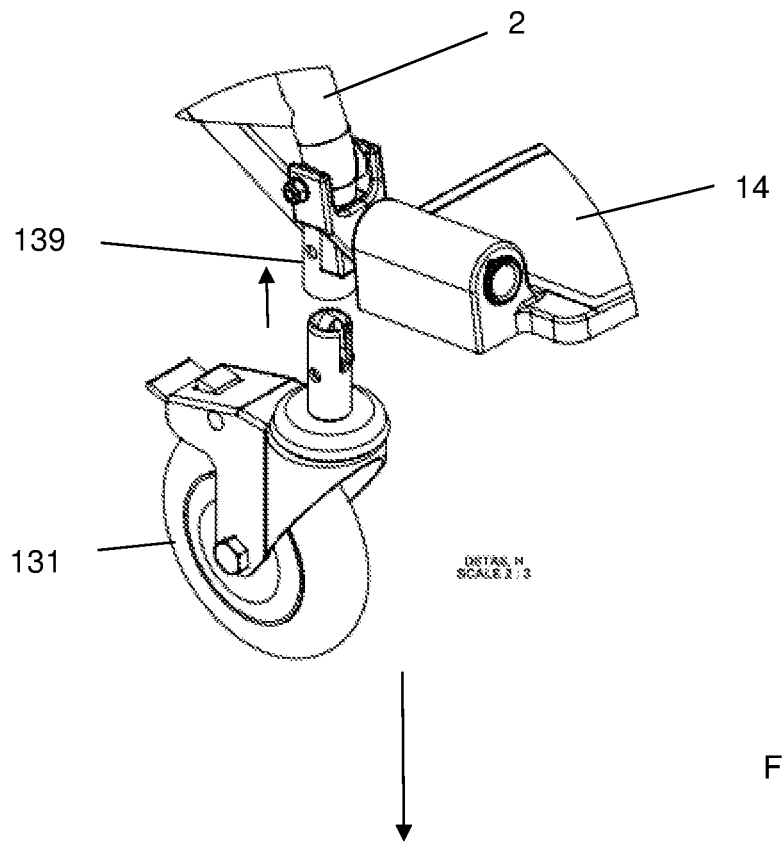
Figure 14:
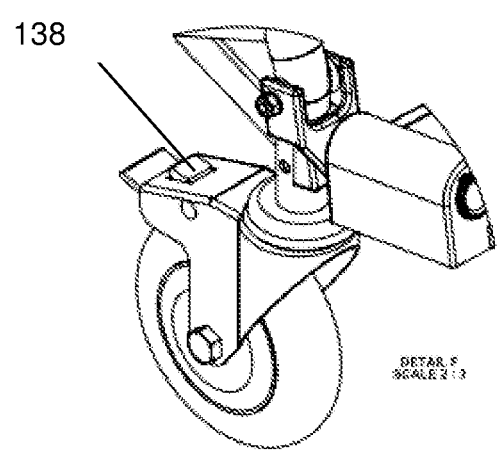

The above description of the wheelchair describes the features of the wheelchair in rear steer configuration. With reference to FIGS. 13 and 14(a)-14(e) the following description will describe the features of the wheelchair that allow it to be converted into front wheel steer configuration. Firstly, the front wheels are removed to reveal drum brake 18 as shown in FIG. 13. The rear wheel 132 is pivoted into a forward position as shown in FIG. 13. In other words the rear arm 130 that connects to the wheel 132 is rotated forwards to shorten the wheel base of the wheelchair. As shown in blown up area 134 shown in FIG. 14(a) and in FIG. 14(b) a locking pin 135, is used to lock the rear wheel in the fixed forward position by inserting the locking pin through sleeves 136 and 137 depicted in FIG. 14(b) and FIG. 14(c) to thereby remove the swivel ability of the rear wheel. In one embodiment the locking pin 135 is the axle of the front wheel that has been removed. A pair of front wheel castor wheels 131 are then inserted into the forward down tube 139 on which the foot rests 14 are secured as shown in FIGS. 13, 14(a) and 14(d) and 14(e). The castor wheels lock into the down tube 139 located at the forward end of the side frame assembly 2 by way of a depressible lug. The castor wheels can be readily engaged or removed from the chair as needed. It is important that the castor wheels have a built in brake 138 to allow the front wheels to be locked from rotation for safety reasons given that the drum brakes of the removed front wheels are not operable.

Figure 11:
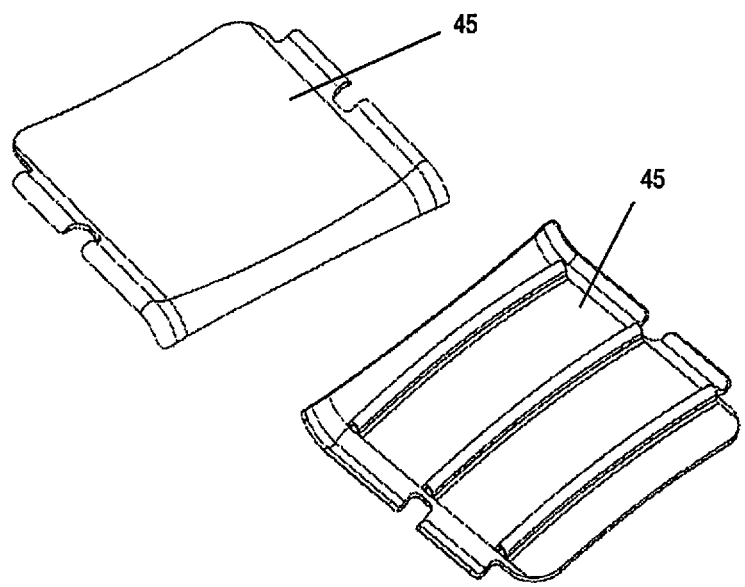
FIG. 11 shows the top and bottom perspective views of a rigid moulded plastics seat for use in the wheelchair of the invention.

With reference to FIG. 1, the back rest uprights 10 may optionally include a support link between the back rest uprights. The back rest 35 and seat support 34 may be made from a wear resistant fabric, such as an acrylic canvas or a nylon canvas. Alternatively the back rest and or seat support may be a solidly contoured detachable insert that is put in place as required. A suitable shaped seat support is shown in FIG. 11. The moulded plastic fibreglass or plastic seat base 45 would clip onto the side frame and would optionally include a foam pad on the seat pad to provide cushioning for the occupant. The back rest may also include a moulded plastic or fibreglass support that slides over the back rest uprights.

Figure 10C:
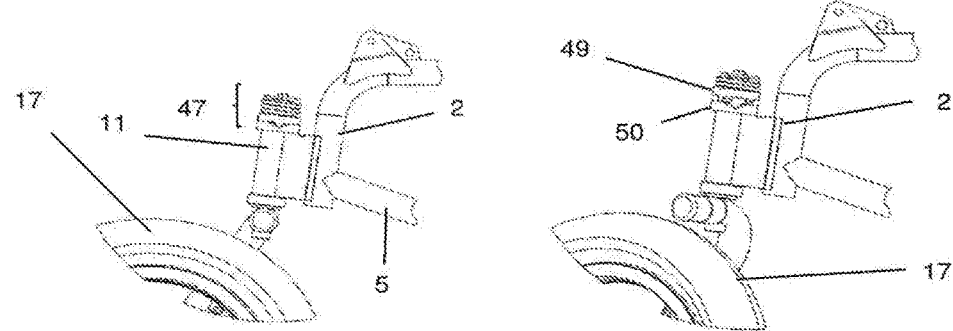
FIG. 10(c) shows a perspective exploded view of the components of the rear wheel mounting connection to the side frame assembly.
Figure 10C:
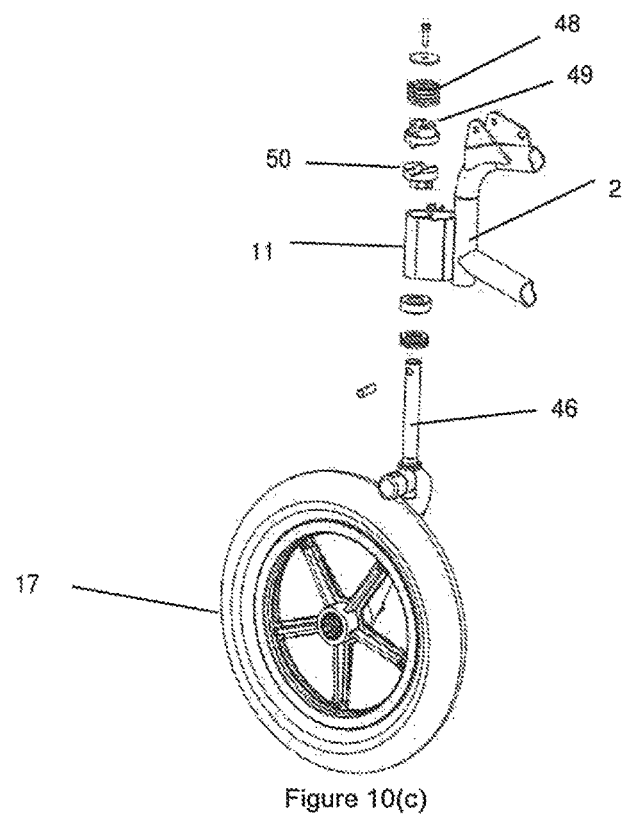
Figure 10D:
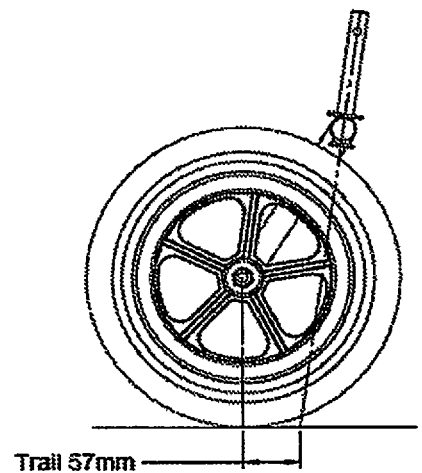
FIG. 10(d) shows a side view of the rear wheel showing the trail of the hub of the wheel relative to the centre of the pivot mount of the wheel to the side frame.

With reference to FIGS. 10(a) to 10(d) each rear wheel 17 is mounted to the side frame assembly by a leg 46 sliding into a rear wheel mounting bracket 11. It is also envisaged that a quick release mechanism provided by a depressible pin that fits into a complimentary hole on the leg 46 would allow for the rear wheel 17 and leg 46 to be quickly removed for compact transport reasons. To enhance the stability of the rear steer wheelchair, the connection of the rear wheel 17 to the side frame assembly 2 has been achieved by using a biasing swivel connection assembly such that when the chair is being propelled forward the wheel trails behind the leg by a trail distance of around 50-60 mm. This is achieved by using a biased swivel connection 47 to (i) keep the wheel in a trailing position and discourage the wheel from turning and becoming unstable and (ii) to hold the wheel in a forward facing position when the wheel chair is collapsed and folded up into a packed position. The biasing may be by spring 48 and face cam 49, 50 as shown in FIGS. 10(a)-10(c), but it is to be appreciated that other biasing means may be employed. One such biasing means would be the use of a detent system or a pin system that biases the wheel into the desirable position.

In the embodiment illustrated the angle of the side frame extending to the leg relative to the normal of the ground is about 4 to 8 degrees. In the embodiment shown in FIG. 10(d) the trail 51 of the wheel is about 57 mm. This angle tends to maintain the wheel in the rear facing position and enhances the directional stability of the wheelchair.

It is to be appreciated that the overall centre of gravity of the chair, and therefore stability of the chair, can be modified by moving the side frames forward or back relative to the wheels of the chair. Similarly adjustments in the height of the seat relative to the wheels will also affect the overall centre of gravity of the chair.

Use of the Wheelchair

The wheelchair is expected to be used as any other standard wheelchair would be used. However, with the rear steer aspect and ease of deployment and collapsibility it is anticipated that this wheelchair will appeal to those wheelchair users who like getting out and going places. Furthermore with the use of larger front wheels with wider pneumatic tyres the wheelchair has the ability to go over rougher terrain with ease. Traditional wheelchairs will stop if their small front wheels hit a pebble or some other imperfection in the ground surface. It is hoped that people associated with wheelchair users will be more inclined to take the wheelchair to places that might not have been suitable for more traditional style wheelchairs.

In use, the wheelchair can be easily deployed by pulling the side frames of the wheelchair apart to lock the 6 bar linkage in a locked position. The pushing arms of the wheelchair can be readily pulled back into a locked position. The footrests are unfolded ready for the occupants feet. When the occupant is positioned in the chair and secured by an optional lap belt, the chair is ready for use. Once the chair has been used and needs to be transported say in a vehicle the pushing handles of the wheelchair can be folded down towards the seat of the chair, the handle that brakes the locked 6 bar linkage configuration is pulled and passed through the seat of the chair to collapse the 6 bar linkage and thereby bring the side frames of the chair closer together. The 6 bar linkage handle can then be used as a carry handle to carry the wheelchair in its collapsed configuration. Various views of the collapsed wheelchair are shown in FIGS. 4(a) to 4(c) and FIGS. 5(a) and (b).

The present invention and its embodiments have been described in detail. However, the scope of the present invention is not intended to be limited to the particular embodiments of the invention described in the specification. Various modifications, substitutions, and variations can be made to the disclosed material without departing from the spirit and/or essential characteristics of the present invention. Accordingly, one of ordinary skill in the art will readily appreciate from the disclosure that later modifications, substitutions, and/or variations performing substantially the same function or achieving substantially the same result as embodiments described herein may be utilized according to such related embodiments of the present invention. Thus, the following claims are intended to encompass within their scope modifications, substitutions, and variations to the embodiments of the invention disclosed herein.

The invention claimed is:

1. A portable and collapsible wheelchair having an interchangeable front wheel steer configuration and a rear wheel steer configuration; and having
   (a) a pair of side frame assemblies each having an upper tube member and a lower tube member and forward and aft sections; and
   (b) a 6 bar linkage mounted on the side frame assemblies, which linkage extends centrally between the side frame assemblies, which linkage is foldable from an extended, in-use position, to a collapsed, folded, position;
   (c) a pair of front wheels with each wheel being attached to the forward section of the side frame assemblies and wherein the front wheels can be converted from having no swivel ability when the wheelchair is in rear steer configuration to having swivel ability when the wheelchair is in a front steer configuration, (d) a pair of rear steer wheels that can swivel freely in a rear steer configuration and which can be converted from having swivel ability when the wheelchair is in rear steer configuration to having no swivel ability when the wheelchair is in front steer configuration, with each rear wheel being attached to the aft section of the side frame assemblies, (e) a pair of collapsible pushing handles that are attached to the side frame assemblies, (f) a pair of arm rests that are attached to the side frame assemblies, (g) a pair of back support arms that secure a back support, wherein each back support arm is attached to the aft section of one of the side frame assemblies and (h) a seat support that extends above the 6 bar linkage and between the side frame assemblies;

wherein in use the wheelchair is deployed by (i) spreading the side frame assemblies apart to extend the 6 bar linkage into a locked position and (ii) putting the pair of collapsible pushing handles into a locked in-use position and further wherein in use the wheelchair is collapsed by (i) pulling a handle proximate the central position of the 6 bar linkage to release the locked position of the 6 bar linkage to pull the side frames assemblies together, and (ii) collapsing the collapsible handles from their in-use locked position to a folded out of use position into a compact, readily lifted and transportable configuration; and further wherein the conversion between rear and front wheel steer configurations is achieved by either locking off the pivot ability in the rear wheels and enabling pivot ability in the front wheels to convert the wheelchair into front wheel steer configuration or by enabling the swivel ability in the rear wheels and removing the pivot ability in the front wheels to convert the wheelchair into rear wheel steer configuration.

2. The wheelchair as claimed in claim 1, wherein the conversion of the front wheels from rear steer configuration to front steer configuration is achieved by replacing the front wheels with a pair of swivelling wheels.

3. The wheelchair as claimed in claim 2, wherein the swivelling wheels are a pair of castor wheels.

4. The wheelchair as claimed in claim 3, wherein the castor wheels include braking means.

5. The wheelchair as claimed in claim 1, wherein the conversion of the rear wheels from rear steer configuration to front steer configuration is achieved by locking off the swivel ability of the rear wheels with a locking pin.

6. The wheelchair as claimed in claim 5, wherein the locking pin is the axle of the front wheel used in rear steer configuration.

7. The wheelchair as claimed in claim 1, wherein the 6 bar linkage includes a pair of geared hinge linkages.

8. The wheelchair as claimed in claim 1, wherein the rear wheel is biased by way of a biasing member to keep the rear steer wheel aligned in a substantially straight ahead manner when in rear steer configuration.

9. The wheelchair as claimed in claim 1, wherein the pair of collapsible pusher handles includes ergonomically angled handles.

10. The wheelchair as claimed in claim 9, wherein the pair of collapsible pusher handles includes a brake lever that activates a front wheel brake in at least one of the front wheels.

11. The wheelchair as claimed in claim 1, wherein the wheelchair is collapsible into a size no greater than about 800 mm×about 350 mm×about 700 mm.

12. The wheelchair as claimed in claim 1, which includes a pair of foot rests that are secured to the forward section of the side frame assembly.

13. The wheelchair as claimed in claim 12, wherein the foot rests can pivot through about 90 degrees relative to the side frame assembly.

14. The wheelchair as claimed in claim 12, wherein each foot rest is designed to rotate upwardly against the side frame assembly.

15. The wheelchair as claimed in claim 14, wherein each foot rest is designed to rotate upwardly against the side frame assembly and then to rotate towards the seat support.

16. The wheelchair as claimed in claim 12, wherein each foot rest is designed to rotate towards the seat support and then to rotate upwardly against the side frame assembly.

17. The wheelchair as claimed in claim 1, which includes at least one hand brake that acts upon at least one of the front wheels.

18. The wheelchair as claimed in claim 1, wherein the handle of the wheelchair that in use is pulled to break the 6 bar linkage upon collapse of the wheelchair is also adapted in size and shape to provide a carry handle for the wheelchair in its collapsed configuration.

* * * * *